United States Patent [19]
Wells et al.

[11] Patent Number: 5,568,280
[45] Date of Patent: Oct. 22, 1996

[54] FACSIMILE ACCESS CONTROLLER FOR CALCULATING A COMMUNICATION CHARGE

[75] Inventors: James Wells, Lansing; David B. Johnson, Freeville; Edward A. Tennant, Newfield, all of N.Y.; Walid Elsoufi, Princeton, N.J.

[73] Assignee: Jamex, Lansing, N.Y.

[21] Appl. No.: 287,170

[22] Filed: Aug. 8, 1994

[51] Int. Cl.$^6$ .............................. H04N 1/32; H04N 1/00; H04M 11/00
[52] U.S. Cl. .................. 358/468; 358/400; 379/100
[58] Field of Search .................... 358/400, 401, 358/402, 404, 406, 434, 438, 442, 468; 379/100, 111, 114, 143, 144, 146, 147

[56] References Cited

U.S. PATENT DOCUMENTS

| | | | |
|---|---|---|---|
| 3,265,153 | 11/1993 | Ozawa | 379/100 |
| 3,870,866 | 3/1975 | Halpern . | |
| 4,823,376 | 4/1989 | Takahashi | 379/100 |
| 4,868,758 | 9/1989 | Kokubu | 379/114 X |
| 4,891,836 | 1/1990 | Takahashi | 379/100 |
| 4,956,721 | 9/1990 | Tasaki et al. | 358/402 |
| 5,008,928 | 4/1991 | Cleghorn | 379/100 |
| 5,276,441 | 1/1994 | Katsurada et al. | 379/119 X |
| 5,381,242 | 1/1995 | Fujii | 358/468 |

FOREIGN PATENT DOCUMENTS

| | | | |
|---|---|---|---|
| 58-133073 | 8/1983 | Japan | H04M 15/00 |
| 60-87568 | 5/1985 | Japan | H04N 1/34 |
| 2-243052 | 9/1990 | Japan | H04N 1/34 |

*Primary Examiner*—Peter S. Wong
*Assistant Examiner*—Eric Frahm
*Attorney, Agent, or Firm*—Nixon, Hargrave, Devans & Doyle

[57] ABSTRACT

A method and apparatus for logging or identifying each page of a facsimile transmission or reception by a facsimile machine with a facsimile access controller is disclosed. The method involves several steps which include monitoring the transmission or reception of data by the facsimile machine for a resolution signal and end-of-line signals in the data, determining the number of lines which will be on a page based upon the resolution signal, counting the number of the end-of-line signals transmitted, detecting an end-of-page signal, and logging a transmission or reception of a page when the total count of the end-of-line signals indicates that a page has been transmitted or the end-of-page signal is detected. The apparatus includes a monitor coupled to the signal line from a facsimile machine for monitoring data on the signal line during facsimile transmissions or receptions. A converter is coupled to the monitor for converting the data from the signal line. A microprocessor is coupled to the converter for detecting a resolution signal and end-of-line signals in the data, determining the number of lines which will be on a page based upon the resolution signal, counting the number of the end-of-line signals transmitted in the data, and detecting the end-of-page signal. A memory is coupled to the microprocessor for storing operations to be executed by the microprocessor. A control device is coupled to the microprocessor for logging each page of a facsimile transmission or reception when the count of end-of-line signals indicates a page has been transmitted or the end-of-page signal is detected.

18 Claims, 6 Drawing Sheets

Make-up codes

| White run lengths | Code word | Black run lengths | Code word |
|---|---|---|---|
| 64 | 11011 | 64 | 0000001111 |
| 128 | 10010 | 128 | 000011001000 |
| 192 | 010111 | 192 | 000011001001 |
| 256 | 0110111 | 256 | 000001011011 |
| 320 | 00110110 | 320 | 000000110011 |
| 384 | 00110111 | 384 | 000000110100 |
| 448 | 01100100 | 448 | 000000110101 |
| 512 | 01100101 | 512 | 0000001101100 |
| 576 | 01101000 | 576 | 0000001101101 |
| 640 | 01100111 | 640 | 0000001001010 |
| 704 | 011001100 | 704 | 0000001001011 |
| 768 | 011001101 | 768 | 0000001001100 |
| 832 | 011010010 | 832 | 0000001001101 |
| 896 | 011010011 | 896 | 0000001110010 |
| 960 | 011010100 | 960 | 0000001110011 |
| 1024 | 011010101 | 1024 | 0000001110100 |
| 1088 | 011010110 | 1088 | 0000001110101 |
| 1152 | 011010111 | 1152 | 0000001110110 |
| 1216 | 011011000 | 1216 | 0000001110111 |
| 1280 | 011011001 | 1280 | 0000001010010 |
| 1344 | 011011010 | 1344 | 0000001010011 |
| 1408 | 011011011 | 1408 | 0000001010100 |
| 1472 | 010011000 | 1472 | 0000001010101 |
| 1536 | 010011001 | 1536 | 0000001011010 |
| 1600 | 010011010 | 1600 | 0000001011011 |
| 1664 | 011000 | 1664 | 0000001100100 |
| 1728 | 010011011 | 1728 | 0000001100101 |

FIG.5(a)

| Run length | Make-up codes |
|---|---|
| 1792 | 00000001000 |
| 1856 | 00000001100 |
| 1920 | 00000001101 |
| 1984 | 000000010010 |
| 2048 | 000000010011 |
| 2112 | 000000010100 |
| 2176 | 000000010101 |
| 2240 | 000000010110 |
| 2304 | 000000010111 |
| 2368 | 000000011100 |
| 2432 | 000000011101 |
| 2496 | 000000011110 |
| 2560 | 000000011111 |

FIG.5(b)

Index of abbreviations used in Recommendation T. 30

| Abbreviation | Function | Signal format | Reference |
|---|---|---|---|
| CED | Called station identification | 2100 Hz | 4.3.3.2 |
| CFR | Confirmation to receive | X010 0001 | 5.3.6.1.4, 1) |
|  |  | 1850 or 1650 Hz for 3s | 4.3.1.2 |
| CRP | Command repeat | X101 1000 | 5.3.6.1.8, 2) |
| CIG | Calling subscriber identification | 1000 0010 | 5.3.6.1.2, 2) |
| CNG | Calling tone | 1100 Hz for 500 ms | 4.3.3.3 |
| CSI | Called subscriber identification | 0000 0010 | 5.3.6.1.1, 2) |
| CTC | Continue to correct | X100 1000 | A.4.1 |
| CTR | Response to continue to correct | X010 0011 | A.4.2 |
| DCN | Disconnect | X101 1111 | 5.3.6.1.8, 1) |
| DCS | Digital command signal | X100 0001 | 5.3.6.1.3, 1) |
| DIS | Digital identification signal | 0000 0001 | 5.3.6.1.1, 1) |
| DTC | Digital transmit command | 1000 0001 | 5.3.6.1.2, 1) |
| EOM | End of message | X111 0001 | 5.3.6.1.6, 1) |
|  |  | 1100 Hz | 4.3.2.4 |
| EOP | End of procedure | X111 0100 | 5.3.6.1.6, 3) |
| EOR | End of retransmission | X111 0011 | A.4.3 |
| ERR | Response for end of retransmission | X011 1000 | A.4.4 |
| FCD | Facsimile coded date | 0110 0000 | A.2.2 |
| FCF | Facsimile control field | - | 5.3.6.1 |
| FIF | Facsimile information field | - | 5.3.6.2 |
| FIT | Failure to train | X010 0010 | 5.3.6.1.4, 2) |
| GC | Group command | 1300 Hz for 1.5-10.0 s | 4.3.2.1 |
|  |  | 2100 Hz for 1.5-10.0 s |  |
| GI | Group identification | 1650 or 1850 Hz | 4.3.1.1 |
| HDLC | High level data link control | - | 5.3 |
| LCS | Line conditioning signals | 1100 Hz | 4.3.2.2 |
| MCF | Message confirmation | X011 0001 | 4.3.1.3 |
|  |  | 1650 or 1850 Hz |  |
| MPS | Multi-page signal | X111 0010 | 5.3.6.1.6, 2) |
| NSC | Non-standard facilities command | 1000 0100 | 5.3.6.1.2, 3) |
| NSF | Non-standard facilities | 0000 0100 | 5.3.6.1.1, 3) |
| NSS | Non-standard set-up | X100 0100 | 5.3.6.1.3, 3) |
| PIN | Procedural interrupt negative | X011 0100 | 5.3.6.1.7, 5) |
| PIP | Procedural interrupt positive | X011 0101 | 5.3.6.1.7, 4) |
| PIS | Procedure interrupt signal | 462 Hz for 3s | 4.3.3.1 |
| PPS | Partial page signal | X111 1101 | A.4.3 |
| PPR | Partial page request | X011 1101 | A.4.4 |
| PRI-EOM | Procedure interrupt-EOM | X111 1001 | 5.3.6.1.6, 4) |
| PRI-EOP | Procedure interrupt-EOP | X111 1100 | 5.3.6.1.6, 6) |
| PRI-MPS | Procedure interrupt-MPS | X111 1010 | 5.3.6.1.6, 5) |
| RCP | Return to control for partial page | 0110 0001 | A.2.2 |
| RNR | Receive not ready | X011 0111 | A.4.4 |
| RR | Receive ready | X111 0110 | A.4.3 |
| RTN | Retrain negative | X011 0010 | 5.3.6.1.7, 3) |
| RTP | Retrain positive | X011 0011 | 5.3.6.1.7, 2) |
| TCF | Training check | Zeros for 1.5 s | 5.3.6.1.3, 4) |
| TSI | Transmitting subscriber identification | X100 0010 | 5.3.6.1.3, 2) |

FACSIMILE ACCESS CONTROLLER FOR CALCULATING A COMMUNICATION CHARGE

FIELD OF THE INVENTION

This invention relates generally to a controller for a facsimile machine and more particularly, to a facsimile access controller for logging or identifying each page of a facsimile transmission from or reception by a facsimile machine.

BACKGROUND OF THE INVENTION

The growing demand for facsimile services has generated an increasing need for access to facsimile machines in public places. Despite this need, store owners and other operators of public spaces have not had the ability to provide these services with their existing facsimile machines.

The growing demand for facsimile services has also effected businesses. Although facsimile services are a great convenience, many businesses have not been able to keep accurate records of their facsimile transmissions and as a result have been unable to recoup the expense of their facsimile services.

Prior systems have been unsuccessful in meeting the needs of the public and of businesses for several reasons. Many of these prior systems involve purchasing a new facsimile machine or modifying extensively an existing facsimile machine, however most businesses already own a facsimile machine and do not want to purchase another or to modify their existing machine. Additionally, many of these prior systems are inaccurate because they count pages by monitoring with sensors when a page has passed through and do not catch when pages are taped together. As a result, two pages may be transmitted, but only one page will be accounted for by these systems. Further, many of these prior systems are not user friendly, because the patron is unaware of the cost of a facsimile transmission until after the document is scanned and/or transmitted.

Accordingly, there is a need for an accurate method and/or apparatus for logging or identifying the transmission or reception of each page by a facsimile machine.

SUMMARY OF THE INVENTION

A method and apparatus for logging or identifying each page of a facsimile transmission or reception by a facsimile machine with a facsimile access controller is disclosed. The method involves several steps which include monitoring the transmission or reception of data by the facsimile machine for a resolution signal and end-of-line signals in the data, determining the number of lines which will be on a page based upon the resolution signal, counting the number of the end-of-line signals transmitted, detecting an end-of-page signal, and logging a charge when the total count of the end-of-line signals indicates that a page has been transmitted or received or the end-of-page signal is detected. The apparatus includes a monitor coupled to the signal line from the facsimile machine for monitoring data on the signal line during facsimile transmissions or receptions. A converter is coupled to the monitor for converting the data from the signal line. A microprocessor is coupled to the converter for detecting a resolution signal and end-of-line signals in the data, determining the number of lines which will be on a page based upon the resolution signal, counting the number of the end-of-line signals transmitted in the data and detecting the end-of-page signal. A memory is coupled to the microprocessor for storing operations to be executed by the microprocessor. A control device is coupled to the microprocessor for logging or identifying each page of a facsimile transmission or reception when the count of end-of-line signals indicates a page has been transmitted or received or the end-of-page signal is detected.

The method and apparatus in accordance with the present invention provides several advantages. With the controller, store owners and operators of other public spaces can convert their existing facsimile machines for public vending use and businesses can use the controller to account accurately for their facsimile transmissions and receptions enabling them to monitor and control their facsimile expenses. Additionally, with the controller, patrons can know ahead of time exactly what the charge for the transmission or reception of a facsimile will be without having to wait for the document to be scanned or transmitted first. Further, with the controller there is no need for a new facsimile machine or invasive wire changes in any existing facsimile machine. Even further, the controller is designed to accurately log or identify when a page has been transmitted or received even when pages are taped together.

BRIEF DESCRIPTION OF THE DRAWINGS

FIG. 5(a) is a first table of make-up codes in accordance with CCITT Recommendation T.30 for use with the first and second embodiments;

FIG. 5(b) is a second table of make-up codes in accordance with CCITT Recommendation T.30 for use with the first and second embodiments; and FIG. 5(c) is a third table of codes in accordance with CCITT Recommendation T.30 for use with the first and second embodiments.

DETAILED DESCRIPTION OF THE INVENTION

Figure 1:
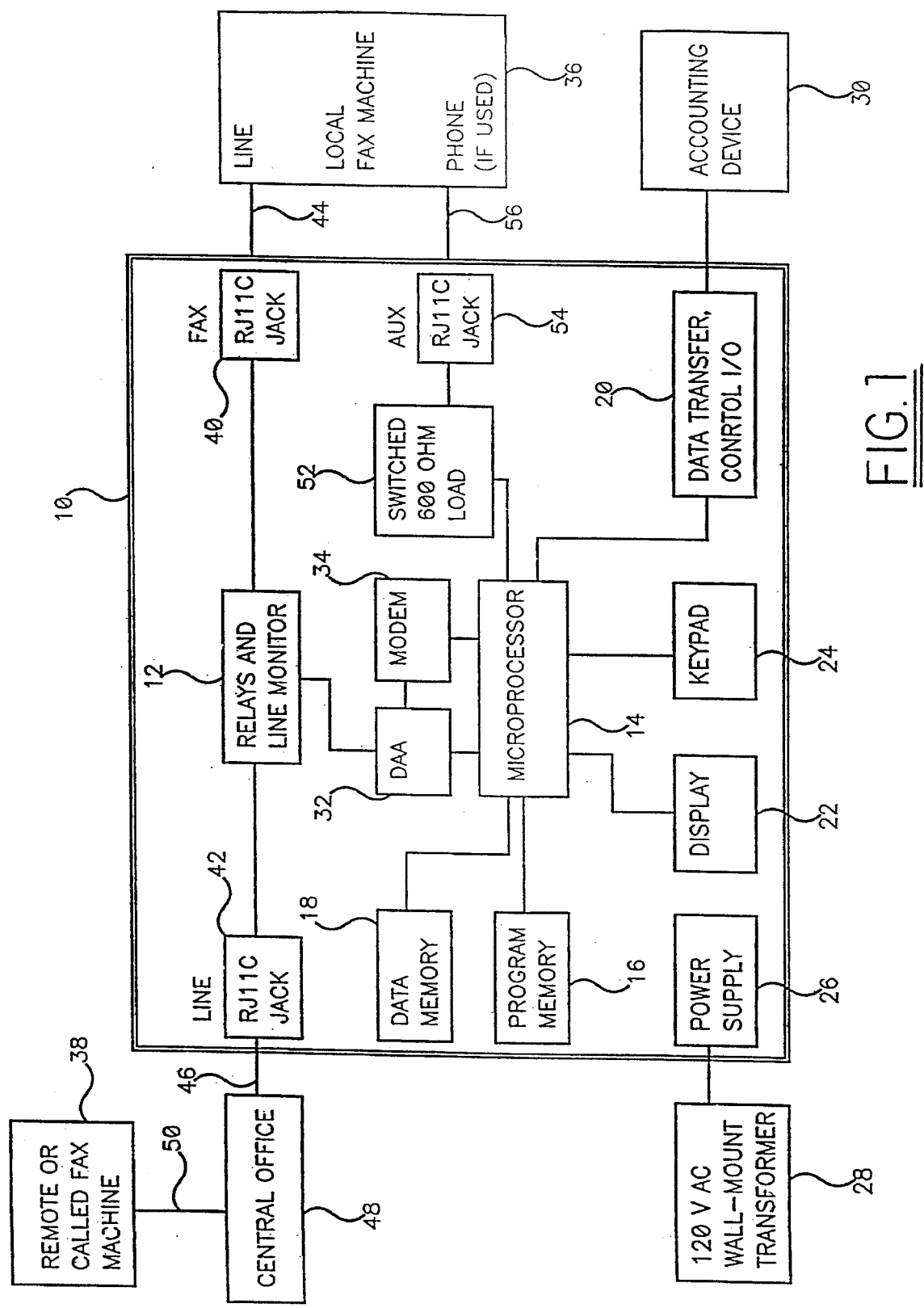
FIG. 1 is a block diagram of a facsimile access controller in accordance with a first embodiment of the present invention.

A facsimile access controller 10 in accordance with one embodiment of the present invention is illustrated in FIG. 1. The facsimile access controller 10 includes relays-and-line-monitor 121 a microprocessor 14, a program memory 16, a data memory 18, and a data-transfer control I/O 20. With controller 10, store owners and operators of other public spaces can generate income with their existing facsimile machines and businesses can accurately account for their facsimile transmissions. Additionally with controller 10, patrons can know exactly what the cost of their facsimile transmission or reception will be before the document to be sent or received is scanned and/or transmitted. When controller 10 is used, there is no need for the purchase of a new facsimile machine or for invasive wire changes in the existing facsimile machines used because controller 10 can be used with existing facsimile machines. Controller 10 is designed to provide an accurate count of pages transmitted or received, even when pages are taped together.

Referring to FIG. 1, facsimile access controller 10 is controlled primarily by microprocessor 14. Microprocessor 14 is coupled to program memory 16, which stores programs executed by microprocessor 14, and is also coupled to data memory 18 which stores data during operations and stores transaction data.

Display 22 and keypad 24 are also coupled to microprocessor 14 to provide a display for any information from microprocessor 14 and to allow an operator to input information to control the operation of microprocessor 14, respectively. Power supply 26 provides power to the components in controller 10. Power supply 26 is coupled to a 120 volt AC wall-mount transformer 28.

Data-transfer control I/O 20 is coupled to microprocessor 14. Control I/O 20 may also be coupled to an accounting device 30 which logs each facsimile transaction. Control I/O 20 could also be coupled to a memory device (not shown) in controller 20 to log each facsimile transaction, rather than accounting device 30. Accounting device 30 may be designed to have a swipe panel to receive and record a credit card to which a charge for the logged facsimile transactions can be assessed.

A direct access arrangement device ("DAA") 32 is coupled between relays-and-line-monitor 12 and microprocessor 14. DAA 32 converts signals to appropriate levels for microprocessor 14 and a modem 34. For example, DAA 32 can convert the ringing telephone signal at about 93 volts A/C to an appropriate volt level for microprocessor 14, such as 5 volts. Relays-and-line-monitor 12 allows controller 10 to "eavesdrop" on the transmissions between local and called facsimile machines 36 and 38.

Modem 34 is coupled between DAA 32 and microprocessor 14. Modem 34 converts analog tones on the telephone line to digital information appropriate for microprocessor 14. Modem 34 also accepts commands from microprocessor 14.

Relays-and-line-monitor 12 is coupled between two jacks 40 and 42. One jack 40 is coupled by a telephone line 44 to local facsimile machine 36 and the other jack 42 is coupled by a telephone line 46 to central office 48. Central office 48 is coupled by another telephone line 50 to called facsimile machine 38. Controller 10 is designed to be used with Group 3 facsimile machines, which are facsimile machines with non-proprietary protocols.

Controller 10 may also include a switched 600 ohm load 52 which is coupled to microprocessor 14 and also to an auxiliary jack 54. If local facsimile machine 36 needs to detect an off-hook condition to operate, then the 600 ohm load 52 is coupled to local facsimile machine 52 by a telephone line 56 to simulate the off-hook condition of the phone.

Figure 2:
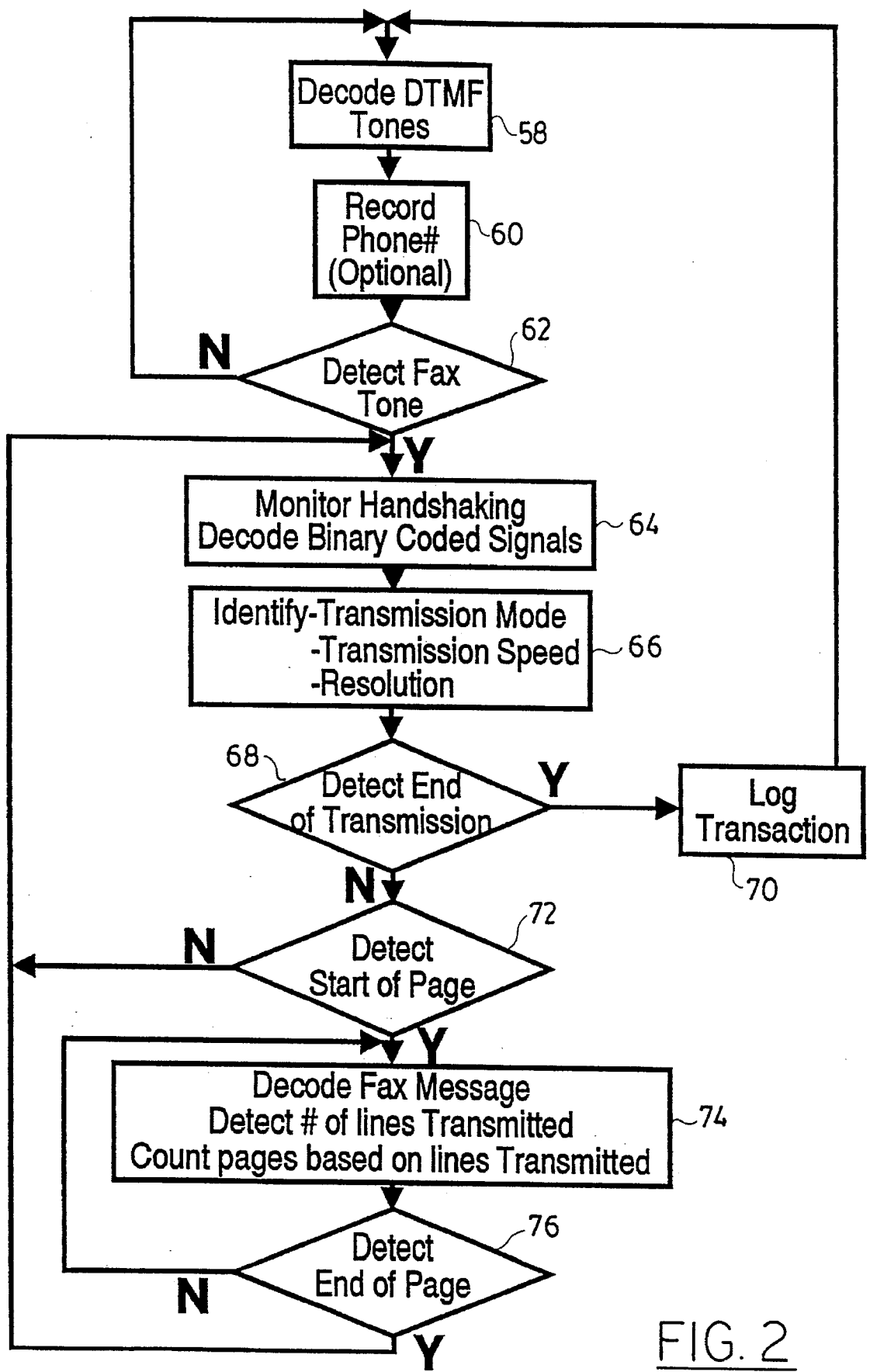
FIG. 2 is a flowchart of one operation with the facsimile access controller shown in FIGS. 1 and 3.

Referring to FIG. 2, a flow chart illustrating one operation of facsimile access controllers 10 and 78 is set forth. Controller 78 is explained in greater detail later with respect to FIG. 3. Although the operation of controllers 10 and 78 is illustrated with local facsimile machine 36 transmitting a facsimile, the operation of controllers 10 and 78 would be the same for local facsimile machine 36 to receive a facsimile. The operation is stored in program memory 16 and is executed primarily by microprocessor 14. To illustrate this operation, reference will be made to various codes in tables set forth in FIGS. 5(a–c) which are established by CCITT. These are uniform codes utilized by virtually all facsimile machines. The CCITT standards are herein incorporated by reference.

When local facsimile machine 36 begins the procedures for transmitting or receiving a facsimile in manners well known in the art, the data is detected by relays-and-line-monitor 12. Monitor 12 transmits the data to DAA 32 which converts the data to appropriate levels and then to modem 34 which converts the analog dual tone multifrequency (DTMF) tones to digital signals for processing by microprocessor 14 (Step 58). Part of the initial data decoded includes the telephone number of called facsimile machine 38, if local facsimile machine 36 is transmitting the facsimile, or the telephone number of local facsimile machine 36, if local facsimile machine 36 is receiving a facsimile. Microprocessor 14 may record the telephone number called in data memory 18, if desired (Step 60).

If called facsimile machine 38 answers when called, then machine 38 transmits a CED signal, which is fax tone, back to local facsimile machine 36 through central office 48 and relays-and-line monitor 12. According to the CCITT standards, the fax tone is a 2100 hertz signal. Microprocessor 14 detects for the fax tone from called facsimile machine 38. Similarly, if local facsimile machine 36 is called, then microprocessor 14 waits to detect the fax tone from local facsimile machine 36. (Step 62). If the fax tone is not detected by microprocessor 14, then the No branch is taken back up to decode DTMF tones in Step 58. If the fax tone is detected by microprocessor 14, then the Yes branch is taken and microprocessor 14 begins monitoring the handshaking procedure. (Step 64).

During the handshaking procedure, microprocessor 14 analyzes and stores data sent by called facsimile machine 38. Typically, called facsimile machine 38 transmits several signals including an NSF signal, a CSI signal, and a DIS signal. The NSF signal identifies the called facsimile's non-standard features, such as passwords or mailboxes, the CSI signal is the called subscriber identification for called facsimile machine 38 which can be any combination of numbers or letters for called facsimile machine 38 and the DIS signal is a digital identification signal.

Microprocessor 14 also analyzes and stores data sent by local facsimile machine 36. Typically, local facsimile machine 36 transmits several signals including an NSS or NSF signal, a TSI signal, and a DCS signal. The NSS or NSF signal is a non-standard set-up or non-standard facility signal, the TSI signal is the transmitting facsimile subscriber identification, which again can be any combination of numbers or letters, and DCS signal is a digital command signal which includes information on the resolution and baud rate. The resolution signal may indicate low resolution, high resolution, or super-high resolution. Typically, low resolution is about 92 to 102 lines per inch, high resolution is 190–200 lines per inch, and super-high resolution is anything greater than 200 lines per inch, such as 300 or 400 lines per inch. When called facsimile machine 38 has received the signals, from local facsimile machine 36, including the DCS signal from local facsimile machine 36, then called facsimile machine 38 transmits a CFR signal to confirm receipt of the signals.

From the DCS signal, microprocessor 14 identifies the transmission mode, transmission speed and resolution and stores them in data memory 18 (Step 66). The transmission mode identifies what software will be needed to decode the data being transmitted by the local and called facsimile machines 36 and 38. The resolution identifies how many lines will be scanned per inch so that the number of pages which have been transmitted can be calculated, as explained in greater detail later.

If local facsimile machine 36 was receiving a facsimile from called facsimile 38 rather than transmitting a facsimile, then the transmission of the signals described above would be reversed with local facsimile machine 36 transmitting the signals described for called facsimile machine 38 and vice versa.

Once the transmission mode, transmission speed, and resolution have been identified, then microprocessor 14 detects to determine if the transmission has ended by checking for an EOP (end of procedure) signal in the data which indicates that the last page has been sent or a DCN (disconnect) signal in the data which indicates that local facsimile machine 36 is about to disconnect. (Step 68).

If the transmission has ended, then the Yes branch is taken and microprocessor 14 signals Control I/O 20 to log the transaction (Step 70). Control I/O 20 may be coupled to an accounting device 30 which can store the logged transactions and assign facsimile charges per page to accounts or to credit card numbers which were input into accounting device 30. Control I/O 20 may also be coupled to a memory device (not shown) in controller 10, instead of to accounting device 30, to store any logged transactions. Once the transaction is logged controller 10 returns to decoding the DTMF tones in Step 58.

If the No branch is taken, then microprocessor 14 detects for the start of the transmission of the page of a facsimile. (Step 72). To detect the start of the transmission of a page, microprocessor 14 looks for a CFR signal from called facsimile machine 38 in response to the DCS signal from local facsimile machine 36, if the first page is being transmitted, and looks for an MCF signal in response to an MPS signal, if a subsequent page is being sent. Again, if local facsimile machine 36 was receiving a facsimile from called facsimile machine 38, then the signals would be reversed. If the start of the page is not detected, then the No branch is taken back to Step 64 to monitor the handshaking procedure.

If the start of the page is detected, then the Yes branch is taken and microprocessor 14 begins decoding, looking for, and counting the number of EOL signals (See FIG. 5(*a*)) in the data in the transmission and also begins detecting or looking for an end-of-page signal. (Step 74). If local and called facsimile machine 36 and 38 are in error correcting mode, then optionally microprocessor 14 could be reprogrammed to readjust the count of EOL signals, so that the total count of EOL signals will not include those from the portion being retransmitted due to an error.

While decoding the data during the facsimile transmission, microprocessor 14 continually detects for the end of the page. (Step 76). Microprocessor 14 detects the end of the page by detecting for an end-of-page signal and by counting the total number of EOL signals in the data. The end-of-page signal could be one of a variety of different types of signals well known in the art, such as six consecutive EOL signals as set forth in CCITT standards. The particular number or type of signal monitored by microprocessor 14 to indicate the end of the page can vary as needed and desired. This allows for the incorporation of proprietary compression schemes other than that defined by CCITT.

Additionally, microprocessor 14 will detect the end of a page if the total count of EOL signals exceeds the total count expected for one page. The total count of EOL signals needed for microprocessor 14 to recognize that one page has been sent or received depends on the resolution and paper size. For example, if a low resolution transmission is taking place, then there will be about 100 lines scanned per inch. If local facsimile machine 36 is programmed to accept and count an 8½×11 inch sheet of paper as one page, then after about 1100 EOL signals are counted, then microprocessor 14 will count one page. The paper size accepted by local facsimile machine 36 and/or the total count of EOL signals required for one page can be set in program memory 16, can be input through keypad 24, or could be downloaded remotely through a connection (not shown).

Checking the total count of EOL signals in addition to checking for the end-of-page signal helps to avoid cheating. For example, if a patron taped two pages together at their ends, then local facsimile machine 36 would not generate the end-of-page signal to indicate the end of the page until the end of the second page. Thus, the patron would only pay for the transmission or reception of one page. However, by also checking the total count of EOL signals in the data, microprocessor 14 is able to recognize the end of a page even without the end-of-page signal and the patron will be properly charged for the transmission or reception of two pages.

If the end of the page is detected by microprocessor 14, then the Yes branch is taken and microprocessor 14 returns back to monitor the handshaking procedure in Step 64. If the end of the page is not detected, then the No branch is taken and microprocessor 14 continues to decode the data in the facsimile transmission in Step 74.

When the facsimile transmission has been completed, then in Step 76, the end of the page will detected and the Yes branch will be taken to monitor the handshaking procedure in Step 64. Next, if local facsimile machine 10 retransmits a new transmission mode, transmission speed, and/or resolution, then in Step 66 microprocessor 14 will adjust transmission mode, transmission speed and/or resolution accordingly. Next, in Step 68 microprocessor 14 will detect for the end of the transmission and in this case will take the Yes branch where the transaction will be finally logged in Step 70, as discussed earlier.

Figure 3:
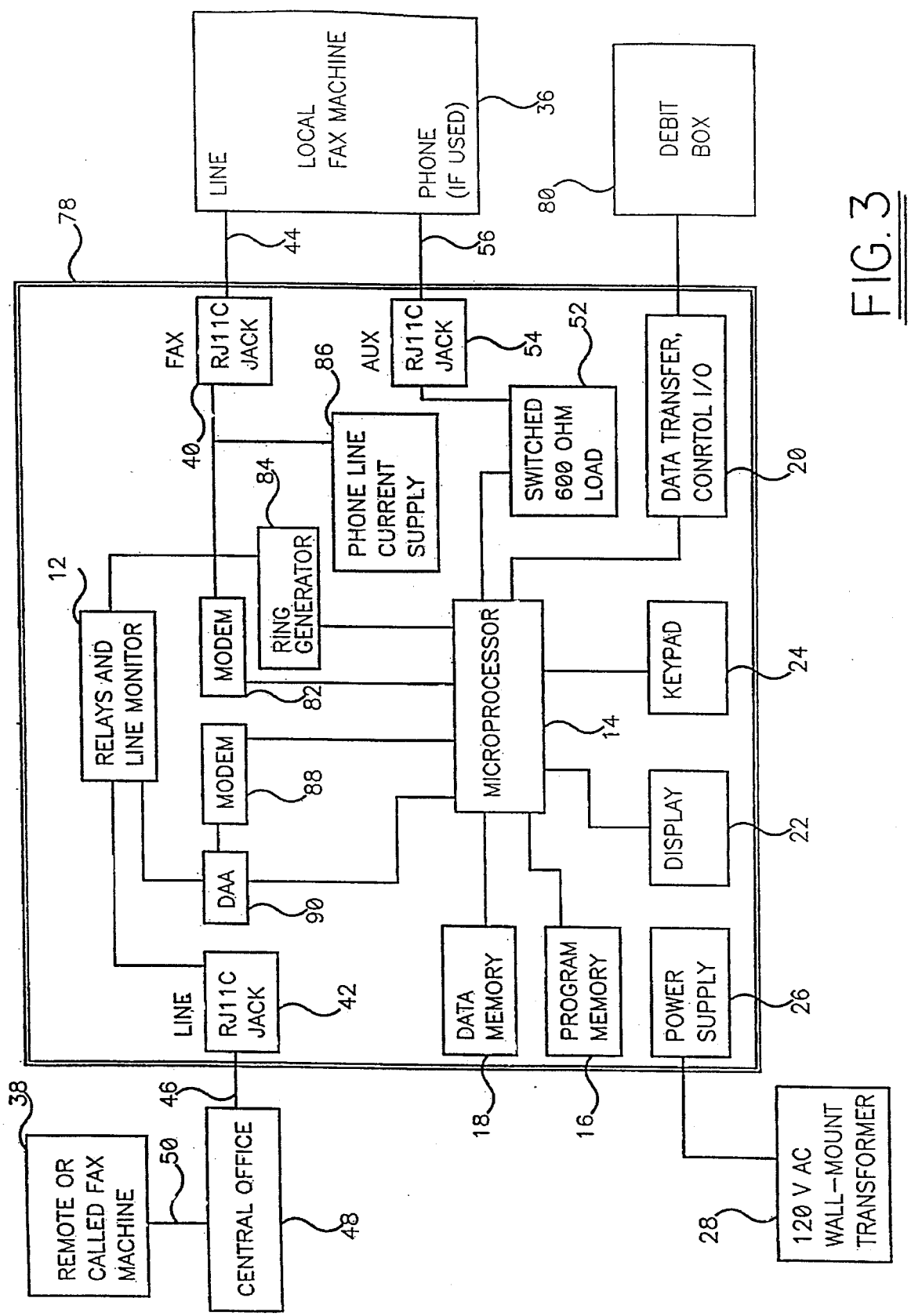
FIG. 3 is a block diagram of a facsimile access controller in accordance with a second embodiment of the present invention.

Referring to FIG. 3, a second embodiment of facsimile access controller 78 is illustrated. Corresponding elements in FIG. 3 have numeral designations which correspond to those used in FIG. 1 and will not be described in detail again.

Facsimile access controller 78 includes microprocessor 14 coupled to program memory 16 and data memory 18. Display 22 and keypad 24 are also coupled to microprocessor 14. Power supply 26 is coupled to the components in controller 10 and to a 120 volt A/C wall-mount transformer 28.

Data-transfer control I/O 20 is coupled to a debit box 80 and also to microprocessor 14. Debit box 80 may accept cash, coins, a credit card, or a debit card (not shown) and can signal control I/O 20 to indicate the amount of coins or cash input or the amount available on the credit card, or the amount on the debit card. Control I/O 20 can deduct from the amount available in debit box 80 for each page faxed or received. Although not shown, debit box 80 could be built into controller 10.

Switched 600 ohm load 52 is coupled to microprocessor 14 and also to auxiliary jack 54. If local facsimile machine 36 requires an off-hook condition for the telephone, telephone line 56 from local facsimile machine 36 can be coupled to auxiliary jack 54 to simulate this condition.

A first modem 82 and a ring generator 84 are both coupled to microprocessor 14 and also to jack 40. Jack 40 is coupled by telephone line 44 to local facsimile machine 36. Ring generator 84 rings local facsimile machine 36 when another facsimile machine has called. A phone line current supply 86 is also coupled to jack 40 to provide current to the system to operate.

A second modem 88 and a direct access arrangement device ("DAA") 90 are also coupled to the microprocessor 14. Modem 88 is also coupled to DAA 90 and DAA 90 is coupled to jack 42. Jack 42 is coupled to central office 48 by telephone line 46 and central office 48 is coupled to called facsimile machine 38 by telephone line 50.

In this embodiment, controller 78 receives and retransmits data sent by either the local or called facsimile machine 36 and 38. As a result, this embodiment works with all facsimile machines because controller 78 can filter out the data in the transmission, remove any nonstandard protocols, and force facsimile machines 36 and 38 to work with standard protocols.

Having controller 78 receive and retransmit the data provides advantages, such as enabling controller 78 to allow the patron to adjust the resolution of the line scan by local facsimile machine 36 which may enable the patron to send a facsimile. For example, if controller 78 charged $2.00 per page for a low resolution transmission or reception and $4.00 per page for a high resolution transmission or reception and local facsimile machine 36 was set for high resolution, the patron who only had $2.00 could not send a facsimile. With controller 78, the patron could, through keypad 24 or some other means not shown, switch to a lower resolution to be able to send or receive a facsimile.

Figure 4:
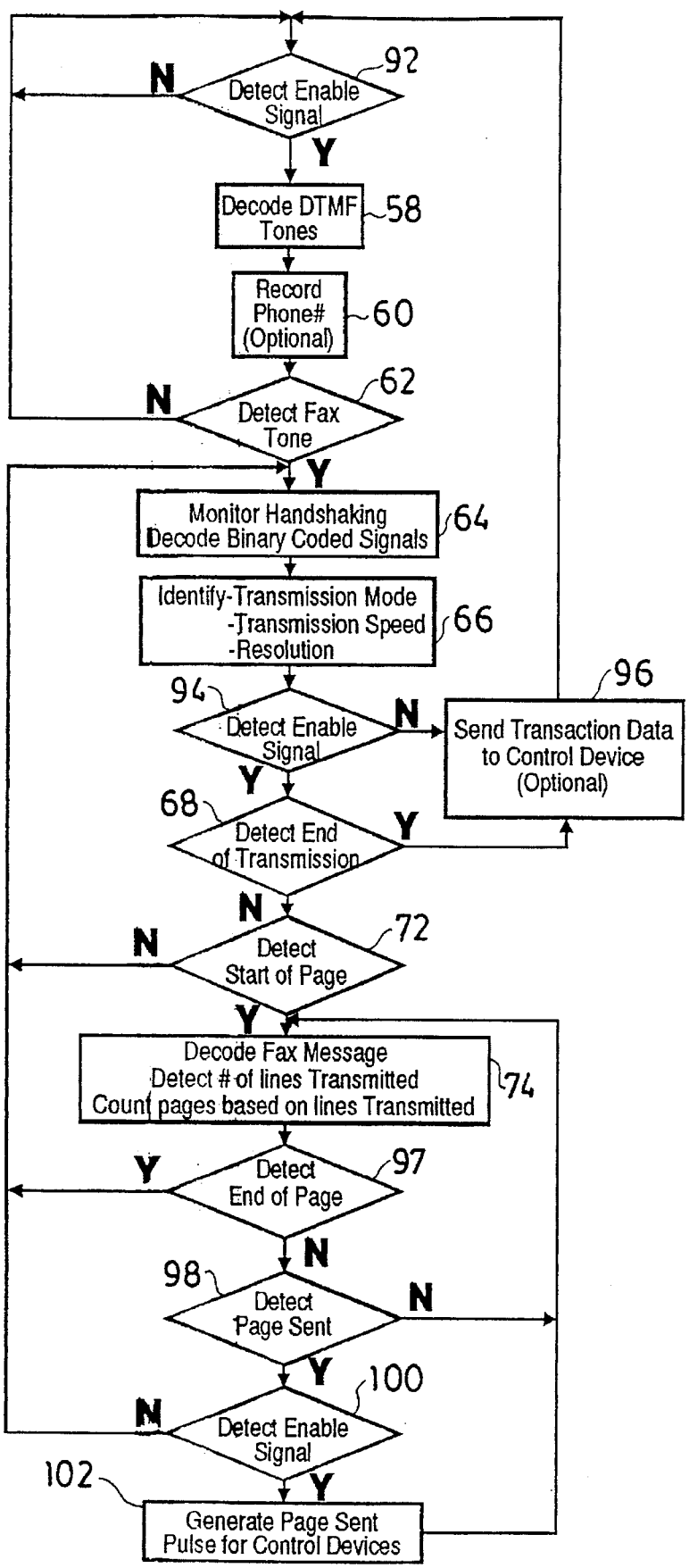
FIG. 4 is a flowchart of another operation with the facsimile access controller shown in FIGS. 1 and 3.

Referring to FIG. 4, a flowchart illustrating another operation of facsimile access controllers 10 and 78 is illustrated. Like the operation disclosed in FIG. 2, the operation disclosed in FIG. 4 can be used with either controller 10 or 78 and operates the same if local facsimile machine 36 receives or transmits a facsimile. Corresponding elements in FIG. 4 have numeral designations which correspond to those used in FIG. 2 and Will not be described here again in detail. The operation is stored in program memory 16 and is executed primarily by microprocessor 14.

Microprocessor 14 first checks to detect an enable signal from data-transfer control I/O 20 (Step 92). When a sufficient amount of cash or coins, or a credit card or a debit card with a sufficient balance has been inserted into debit box 80, a signal is transmitted to control I/O 20. Control I/O 20 transmits an enable signal to microprocessor 14 to indicate that a page can be transmitted or received. If an enable signal is not detected, then the No branch is taken back to detect for an enable signal again in Step 92. If an enable signal is detected, the Yes branch is taken and local facsimile machine 36 may begin transmitting data for the facsimile transmission in manners well known in the art. Modem 82 converts the analog tones from local facsimile machine 36 to digital signals appropriate for microprocessor 14. Microprocessor 14 decodes the DTMF tones from local facsimile machine 36. (Step 58). The data will contain the phone number dialed which microprocessor 14 may store in data memory 18, if desired. (Step 60). Microprocessor 14 retransmits the data to modem 88 which converts the digital signals to analog signals and DAA 90 converts the analog signals to appropriate levels for central office 48. Central office 48 transmits the data to called facsimile machine 38. The operation described above is reversed if data is being sent to local facsimile machine 36 from called facsimile machine 38.

Next, microprocessor 14 waits to detect a facsimile tone from called facsimile machine 38. (Step 38). If a facsimile tone is not detected, then the No branch is taken back to detect for an enable signal in Step 92. Again, if local facsimile machine 36 is receiving a facsimile transmission, then the operation is reversed with microprocessor 14 waiting to detect a facsimile tone from local facsimile machine 36. If a facsimile tone is detected, then the Yes branch is taken and microprocessor 14 begins monitoring the handshaking procedure. (Step 64). During the handshaking procedure, microprocessor 14 identifies the transmission mode, transmission speed and resolution. (Step 66). Again, the signals described earlier which are transmitted during the handshaking procedure are reversed if local facsimile machine 36 is receiving rather than transmitting a facsimile to called facsimile machine 38.

When the transmission mode, transmission speed, and resolution are identified, microprocessor 14 detects again for an enable signal. (Step 94). If an enable signal is not detected, then the No ranch is taken and microprocessor 14 may optionally send any recorded transactions to control I/O 20. (Step 96). Control I/O 20 may then signal debit box 80 to debit an appropriate amount for each page transmitted or received. In this particular embodiment, facsimile access controller 78 might as an example charge $2.50 for the first page of a transmission and $1.00 per page for each page thereafter for pages sent within the United States and might charge $8.00 for the first page and $3.00 per page for each page thereafter for pages sent outside the United States. The particular amounts charged can vary as needed and desired. Additionally, the amount charged for each page transmitted or received may be adjusted by the operator through keypad 24, by the software program stored in program memory 16, or remotely from a system (not shown).

If an enable signal is detected, then the Yes branch is taken and microprocessor 14 detects for the end of transmission. (Step 68). If the end of transmission is detected, then the Yes branch is taken and microprocessor 14 may optionally send any recorded transactions to control I/O 20. (Step 96). If the end of transmission is not detected, then the No branch is taken and microprocessor 14 begins to detect for the start of the page. (Step 72).

If the start of the page is not detected, then the No branch is taken back to monitor the handshaking procedure in Step 64. If the start of the page is detected by microprocessor 14, then the Yes branch is taken and microprocessor 14 begins decoding, looking for, counting the number of EOL signals in the data and detecting or looking for the end-of-page signal. (Step 74).

While decoding the data during the facsimile transmission or reception, microprocessor 14 continually detects for the end of the page. (Step 97). If the end of the page is detected by detecting an end-of-page signal, then the Yes branch is taken back to the monitor the handshaking procedure in Step 64. If the end of the page is not detected, then the No branch is taken and microprocessor 14 detects to see if a page has been sent or received by comparing the total count of EOL signals with the number of EOL signals expected for one page. (Step 98). As discussed earlier, the number of EOL signals per page depends on the paper size selected and the resolution. If a page has not been sent or received, then the No branch is taken back to count the EOL signals in Step 74. If a page has been sent or received, then the Yes branch is taken to detect an enable signal. (Step 100).

If microprocessor 14 detects an enable signal in Step 100, then the Yes branch is taken and microprocessor 14 generates a page-sent-or-received signal which is sent to control I/O 20. (Step 102). Control I/O 20 sends out a signal to debit box 80 which debits the amount in the debit box 80 for one page being transmitted or received. When the amount or value has been deducted, control I/O 20 checks debit box 80 to see if there is a sufficient sum deposited or left on the debit card for the transmission or reception of another page. If there is enough for the transmission or reception of another page, then control I/O 20 sends an enable signal to microprocessor 14.

If an enable signal is not detected, then the No branch is taken back to monitor the handshaking procedure in Step 64. Next, if transmission mode, transmission speed, and/or resolution have been changed, then microprocessor 14 identifies the new transmission mode, transmission speed, and/or resolution in Step 66. Microprocessor 14 then detects for the enable signal again and when the detect enable signal is not detected in Step 94, the No branch is taken and microprocessor 14 may record the transaction in control I/O in Step 96. Control I/O 20 may then debit debit box 80 for any remaining facsimile charges.

Having thus described the basic concept of the invention, it will be readily apparent to those skilled in the art that the foregoing detailed disclosure is intended to be presented by way of example only, and is not limiting. Various alterations, improvements, and modifications will occur and are intended to those skilled in the art, though not expressly stated herein. These modifications, alterations, and improvements are intended to be suggested hereby, and are within the spirit and scope of the invention. Accordingly, the invention is limited only by the following claims and equivalents thereto.

What is claimed is:

1. A method for logging or identifying each page of a facsimile transmitted or received by a facsimile machine, the method comprising the steps of:

monitoring the transmission or reception of data from or to the facsimile machine for a resolution signal and end-of-line signals in the data;

determining the number of lines which will be on a page based upon the resolution signal;

counting the number of end-of-line signals monitored in a row;

detecting an end-of-page signal; and logging or identifying the transmission or reception of a page when the total count of the end-of-line signals indicates that a page had been transmitted or received or the end-of-page signal is detected.

2. The method according to claim 1 further comprising the steps of:

detecting a facsimile tone; and identifying the transmission mode and transmission speed from a command signal in the data.

3. The method according to claim 2 further comprising the steps of:

detecting the end of the transmission or reception; and logging a charge for the page when the end of the transmission or reception is detected.

4. The method according to claim 3 further comprising the steps of:

detecting the start of the page when a confirmation signal is monitored in response to the command signal or to a multiple page signal.

5. The method according to claim 1 further comprising the steps of:

signalling a controller coupled to a debit box when a sufficient value for transmitting or receiving a page of a facsimile is detected by the debit box; and transmitting an enable signal from the controller to allow a transmission or reception of data by the facsimile machine.

6. The method according to claim 5 further comprising the steps of:

generating a page-sent-or-received signal when a page is transmitted or received; and debiting a value from the debit card in the debit box or from the amount in cash or coins in the debit box when a page-sent-or-received signal is received.

7. A controller for logging or identifying each page of a facsimile transmitted or received by a facsimile machine the controller comprising:

means for monitoring the transmission or reception of data from or to the facsimile machine for a resolution signal and end-of-line signals in the data;

means for determining the number of lines which will be on a page based upon the resolution signal;

means for counting the number of the end-of-line signals transmitted;

means for detecting an end-of-page signal; and means for logging or identifying the transmission or reception of a page when the total count of the end-of-line signals indicates that a page had been transmitted or received, or the end-of-page signal is detected.

8. The controller according to claim 7 further comprising:

means for detecting a facsimile tone; and means for identifying the transmission mode and transmission speed from a command signal in the data.

9. The controller according to claim 8 further comprising:

means for detecting the end of the transmission or reception; and means for logging a charge for the page when the end of the transmission or reception is detected.

10. The controller according to claim 9 further comprising:

means for detecting the start of the page when a confirmation signal is monitored in response to the command signal or to a multiple page signal.

11. The controller according to claim 7 further comprising:

means for signalling a controller coupled to a debit box when a sufficient value for transmitting or receiving a page of a facsimile is detected by the debit box; and means for transmitting an enable signal from the controller to allow a transmission or reception of data by the facsimile machine.

12. The controller according to claim 11 further comprising:

means for generating a page sent or received signal when a page is transmitted or received; and means for debiting a value from the debit card in the debit box or from the amount in cash or coins in the debit box when a page-sent-or-received signal is received.

13. A facsimile access controller for logging each page of a facsimile transmission transmitted or received on a signal line from a facsimile machine, the controller comprising:

a monitor coupled to the signal line for monitoring data on the signal line during facsimile transmissions;

at least one converter coupled to said line monitor for converting the data from the signal line;

a microprocessor coupled to said converter for detecting a resolution signal and end-of-line signals in the data, determining the number of lines which will be on a page based upon the resolution signal, counting the number of the end-of-line signals transmitted in the data, and detecting an end-of-page signal;

a memory coupled to the microprocessor for storing operations to be executed by the microprocessor; and a control device coupled to said microprocessor for logging a charge for each page of a facsimile transmission when the count of end-of-line signals indicates a page has been transmitted or received or the end-of-page signal is detected.

14. The controller according to claim 13 further comprising an accounting device coupled to the control device for storing the charges for each page of facsimile transmission.

15. The controller according to claim 13 further comprising a debit box coupled to the control device, said debit box designed to receive cash, coins, or a debit card and to deduct a preset amount from the value of cash, coin, or on the debit card for each page of facsimile transmission.

16. The controller according to claim 3 wherein said monitor comprises relays and a line monitor.

17. The controller according to claim 13 wherein said monitor comprises a first modem coupled between the facsimile machine and said microprocessor and a second modem coupled between a central office connection and said microprocessor.

18. The controller according to claim 13 further comprising a load coupled to the facsimile machine to simulate an off-hook condition.

* * * * *